United States Patent
Suda et al.

(10) Patent No.: US 10,099,392 B2
(45) Date of Patent: Oct. 16, 2018

(54) ELECTRIC SCISSORS

(71) Applicant: MAKITA CORPORATION, Anjo-shi, Aichi (JP)

(72) Inventors: Hidekazu Suda, Anjo (JP); Motohiro Omura, Anjo (JP)

(73) Assignee: MAKITA CORPORATION, Anjo-shi (JP)

( * ) Notice: Subject to any disclaimer, the term of this patent is extended or adjusted under 35 U.S.C. 154(b) by 169 days.

(21) Appl. No.: 15/221,253

(22) Filed: Jul. 27, 2016

(65) Prior Publication Data

US 2017/0036359 A1 Feb. 9, 2017

(30) Foreign Application Priority Data

Aug. 4, 2015 (JP) ................................. 2015-154478

(51) Int. Cl.
| | |
|---|---|
| *B26B 15/00* | (2006.01) |
| *H02P 7/03* | (2016.01) |
| *H02P 3/08* | (2006.01) |
| *H02K 7/06* | (2006.01) |
| *A01G 3/037* | (2006.01) |

(52) U.S. Cl.
CPC .............. *B26B 15/00* (2013.01); *A01G 3/037* (2013.01); *H02K 7/06* (2013.01); *H02P 3/08* (2013.01); *H02P 7/04* (2016.02)

(58) Field of Classification Search
CPC .. B26B 15/00; H02K 7/06; H02P 7/04; H02P 3/08
USPC ........................................................ 30/228
See application file for complete search history.

(56) References Cited

U.S. PATENT DOCUMENTS

| | | | |
|---|---|---|---|
| 8,122,607 B2 * | 2/2012 | Maniwa | B26B 15/00 30/228 |
| 8,656,597 B2 * | 2/2014 | Pellenc | A01G 3/037 30/194 |
| 9,120,235 B2 * | 9/2015 | Maniwa | B26B 15/00 |
| 9,634,583 B2 * | 4/2017 | Suda | H02P 29/0241 |
| 9,757,869 B1 * | 9/2017 | Wada | B26B 15/00 |

(Continued)

FOREIGN PATENT DOCUMENTS

| | | |
|---|---|---|
| CN | 202241198 U | 5/2012 |
| CN | 203618435 U | 6/2014 |

(Continued)

OTHER PUBLICATIONS

English translation of FR 2838998, publication date: Oct. 31, 2003.*

(Continued)

*Primary Examiner* — Hwei C Payer
(74) *Attorney, Agent, or Firm* — Oliff PLC

(57) ABSTRACT

Electric scissors comprise a motor, a movable blade, a transmission mechanism, an operation device, an operation signal output device, a control device, a drive circuit, and a forced stop device. The forced stop device is configured to stop the motor when an abnormal state is present in which the value of the operation signal output from the operation signal output device is a value determined in the control device to rotate the motor in a specific rotation direction out of the first and the second rotation directions or to stop the motor, and in which the motor is rotating in a direction opposite to the specific rotation direction.

11 Claims, 12 Drawing Sheets

(56) References Cited

U.S. PATENT DOCUMENTS

| | | | | |
|---|---|---|---|---|
| 9,853,586 B2* | 12/2017 | Kusakawa | ............... | H02P 27/04 |
| 9,888,632 B2* | 2/2018 | Zhou | ........................ | B26B 15/00 |
| 2010/0269355 A1* | 10/2010 | Yang | ....................... | A01G 3/037 |
| | | | | 30/228 |
| 2013/0000130 A1 | 1/2013 | Maniwa | | |
| 2017/0036359 A1* | 2/2017 | Suda | ......................... | H02P 7/04 |

FOREIGN PATENT DOCUMENTS

| | | |
|---|---|---|
| DE | 202012005352 U1 | 6/2012 |
| EP | 2540460 A1 | 1/2013 |
| FR | 2838998 A1 | 10/2003 |
| JP | 3537649 B2 | 6/2004 |

OTHER PUBLICATIONS

Dec. 15, 2016 Extended European Search Report issued in European Patent Aplication No. 16182197.

Mar. 27, 2018 Office Action issued in European Patent Application No. 16 182 197.0.

* cited by examiner

Fig.5A

| STATE OF UPPER BLADE (TRIGGER OPERATION STATE) | St | Sc1 | Sc2 | Sc3 | Sc4 | So | Sp | Q1 | Q2 | Q3 | Q4 | Q5 | m1 | m2 | MOTOR |
|---|---|---|---|---|---|---|---|---|---|---|---|---|---|---|---|
| STOPPED (TRIGGER STOPPED) | 2.3~2.7V | L | L | L | L | H | H | OFF | OFF | OFF | OFF | ON | L | L | STOPPED |
| OPENING OPERATION (TRIGGER RETURNED) | MORE THAN 2.7V | L | H | L | L | H | H | OFF | ON | ON | OFF | ON | L | H | CW |
| CLOSING OPERATION (TRIGGER PULLED) | LESS THAN 2.3V | H | L | L | H | H | H | ON | OFF | OFF | ON | ON | H | L | CCW |
| START UNINTENTIONAL CLOSING OPERATION : OCCURRENCE OF ABNORMALITY (TRIGGER STOPPED or RETURNED) | 2.3V~ | H | L | L | H | H | H (→L) | ON | OFF | OFF | ON | ON (→OFF) | H (→L) | L | CCW (→STOPPED) |
| STOPPED : PROTECTIVE ACTION (TRIGGER STOPPED or RETURNED) | 2.3V~ | H | L | L | H | H | L | ON | OFF | OFF | ON | OFF | L | L | STOPPED |

Fig.5B

| STATE OF UPPER BLADE (TRIGGER OPERATION STATE) | St | m1 | m2 | Pt | Pm | CL | Sp |
|---|---|---|---|---|---|---|---|
| STOPPED (TRIGGER STOPPED) | 2.3~2.7V | L | L | H | L | L | H |
| OPENING OPERATION (TRIGGER RETURNED) | MORE THAN 2.7V | L | H | H | L | L | H |
| CLOSING OPERATION (TRIGGER PULLED) | LESS THAN 2.3V | H | L | L | H | L | H |
| START UNINTENTIONAL CLOSING OPERATION : OCCURRENCE OF ABNORMALITY (TRIGGER STOPPED or RETURNED) | 2.3V~ | H (→L) | L | H | L (→H) | L (→H) | H (→L) |
| STOPPED : PROTECTIVE ACTION (TRIGGER STOPPED or RETURNED) | 2.3V~ | L | L | H | (H→)L | (H→)L | L |

Fig.7A

| STATE OF UPPER BLADE (TRIGGER OPERATION STATE) | St | Sc1 | Sc2 | Sc3 | Sc4 | So | Sp | Q1 | Q2 | Q3 | Q4 | Q5 | m1 | m2 | MOTOR |
|---|---|---|---|---|---|---|---|---|---|---|---|---|---|---|---|
| STOPPED (TRIGGER STOPPED) | 2.3~2.7V | L | L | L | L | H | H | OFF | OFF | OFF | OFF | ON | L | L | STOPPED |
| OPENING OPERATION (TRIGGER RETURNED) | MORE THAN 2.7V | L | H | H | L | H | H | OFF | ON | ON | OFF | ON | L | H | CW |
| CLOSING OPERATION (TRIGGER PULLED) | LESS THAN 2.3V | H | L | L | H | H | H | ON | OFF | OFF | ON | ON | H | L | CCW |
| START UNINTENTIONAL CLOSING OPERATION : OCCURRENCE OF ABNORMALITY (TRIGGER STOPPED or RETURNED) | 2.3V~ | H | L | L | H | H | H (→L) | ON (→OFF) | OFF | OFF | ON (→OFF) | ON (→OFF) | H (→L) | L | CCW (→ STOPPED) |
| STOPPED : PROTECTIVE ACTION (TRIGGER STOPPED or RETURNED) | 2.3V~ | H | L | L | H | H | L | OFF | OFF | OFF | OFF | OFF | L | L | STOPPED |

Fig.7B

| STATE OF UPPER BLADE (TRIGGER OPERATION STATE) | St | m1 | m2 | Pt | Pm | CL | Sp |
|---|---|---|---|---|---|---|---|
| STOPPED (TRIGGER STOPPED) | 2.3~2.7V | L | L | H | L | L | H |
| OPENING OPERATION (TRIGGER RETURNED) | MORE THAN 2.7V | L | H | H | L | L | H |
| CLOSING OPERATION (TRIGGER PULLED) | LESS THAN 2.3V | H | L | L | H | L | H |
| START UNINTENTIONAL CLOSING OPERATION : OCCURRENCE OF ABNORMALITY (TRIGGER STOPPED or RETURNED) | 2.3V~ | H (→L) | L | H | L (→H) | L (→H) | H (→L) |
| STOPPED : PROTECTIVE ACTION (TRIGGER STOPPED or RETURNED) | 2.3V~ | L | L | H | (H→)L | (H→)L | L |

Fig.9A

| STATE OF UPPER BLADE (TRIGGER OPERATION STATE) | St | Sc1 | Sc2 | Sc3 | Sc4 | So | Sp | Q1 | Q2 | Q3 | Q4 | Q5 | m1 | m2 | MOTOR |
|---|---|---|---|---|---|---|---|---|---|---|---|---|---|---|---|
| STOPPED (TRIGGER STOPPED) | 2.3~2.7V | L | L | L | L | H | H | OFF | OFF | OFF | OFF | ON | L | L | STOPPED |
| OPENING OPERATION (TRIGGER RETURNED) | MORE THAN 2.7V | L | H | H | L | H | H | OFF | ON | ON | OFF | ON | L | H | CW |
| CLOSING OPERATION (TRIGGER PULLED) | LESS THAN 2.3V | H | L | L | H | H | H | ON | OFF | OFF | ON | ON | H | L | CCW |
| START UNINTENTIONAL CLOSING OPERATION : OCCURRENCE OF ABNORMALITY (TRIGGER STOPPED or RETURNED) | 2.7 V OR LESS | L | H | H | L | H | H (→L) | OFF | ON (→OFF) | ON (→OFF) | OFF | ON (→OFF) | L | H (→L) | CCW (→ STOPPED) |
| STOPPED : PROTECTIVE ACTION (TRIGGER STOPPED or RETURNED) | 2.7 V OR LESS | L | H | H | L | H | L | OFF | OFF | OFF | OFF | OFF | L | L | STOPPED |

Fig.9B

| STATE OF UPPER BLADE (TRIGGER OPERATION STATE) | St | m1 | m2 | Pt | Pm | CL | Sp |
|---|---|---|---|---|---|---|---|
| STOPPED (TRIGGER STOPPED) | 2.3~2.7V | L | L | H | L | L | H |
| OPENING OPERATION (TRIGGER RETURNED) | MORE THAN 2.7V | L | H | L | H | L | H |
| CLOSING OPERATION (TRIGGER PULLED) | LESS THAN 2.3V | H | L | H | L | L | H |
| START UNINTENTIONAL CLOSING OPERATION : OCCURRENCE OF ABNORMALITY (TRIGGER STOPPED or RETURNED) | 2.7 V OR LESS | L | H (→L) | H | L (→H) | L (→H) | H (→L) |
| STOPPED : PROTECTIVE ACTION (TRIGGER STOPPED or RETURNED) | 2.7 V OR LESS | L | L | H | (H→)L | (H→)L | L |

ELECTRIC SCISSORS

CROSS-REFERENCE TO RELATED APPLICATIONS

This application claims the benefit of Japanese Patent Application No. 2015-154478 filed Aug. 4, 2015 in the Japan Patent Office, and the entire disclosure of Japanese Patent Application No. 2015-154478 is incorporated herein by reference.

BACKGROUND

The present disclosure relates to electric scissors configured to open and close its blades by a motor.

As disclosed in Japanese Patent No. 3537649, electric scissors are known that are configured to open and close its blades by rotating a motor in accordance with trigger operation. This type of electric scissors are used in various applications such as pruning of garden trees and fruit trees, landscape gardening, etc.

Electric scissors according to Japanese Patent No. 3537649 comprise a sensor that outputs an analog signal corresponding to both a pull amount of a trigger and opened and closed positions of blades, and are configured to cause the analog signal from the sensor to be input to a CPU. Then, the CPU may causes the motor to forward, reverse or stop in response to the input analog signal, thereby to open, close or stop the blades.

SUMMARY

The electric scissors configured such that the CPU controls rotation of the motor in response to the analog signal corresponding to the pull amount of the trigger and the like is convenient since a user can finely adjust the movement and positions of the blades by operating the trigger.

However, rotation of the motor relies on the control of the CPU (i.e., software control). Thus, when abnormality such as failure or malfunction occurs to the CPU, there is a possibility that the blades may operate in a manner unintended by the user. For example, the blades may start to be closed even though the user does not operate the trigger, or the blades may start to be opened even though the user is pulling the trigger.

In one aspect of the present disclosure, it is desirable that, when some abnormality occurs to a control device for controlling the motor and the blades start operation unintended by the user, the operation can be suppressed.

Electric scissors in one aspect of the present disclosure comprise a motor, a movable blade, a transmission mechanism, an operation device, an operation signal output device, a control device, a drive circuit, and a forced stop device.

The movable blade is a blade for cutting a cutting object, and is configured to be rotatable in a closing direction in an opening direction opposite to the closing direction. The closing direction is a direction in which the cutting object can be cut. The transmission mechanism is configured to transmit a rotational force of the motor to the movable blade. The transmission mechanism rotates the movable blade in the closing direction when the motor rotates in a first rotation direction, and rotates the movable blade in the opening direction when the motor rotates in a second rotation direction opposite to the first rotation direction. The operation device is configured to be operated by a user for operation of the motor. The operation signal output device is configured to output an operation signal having a value corresponding to an operation state of the operation device. The control device is configured to determine whether to rotate the motor in the first rotation direction or in the second rotation direction, or stop the motor, based on the value of the operation signal output from the operation signal output device, and output a control signal corresponding to a determination result. The drive circuit is configured to supply electric power to the motor in accordance with the control signal output from the control device to actuate the motor in response to the control signal. The forced stop device is configured to stop the motor when an abnormal state is present. The abnormal state is a state in which the value of the operation signal output from the operation signal output device is a value determined in the control device to rotate the motor in a specific rotation direction out of the first and the second rotation directions or to stop the motor, and in which the motor is rotating in a direction opposite to the specific rotation direction.

According to the electric scissors configured as above, when the motor is actually rotating in a direction opposite to the specific rotation direction even though the operation signal is output that has a value determined in the control device to rotate the motor in the specific rotation direction or to stop the motor (i.e., the user has no intention to rotate the motor in the specific rotation direction), the rotation is stopped by the forced stop device.

Therefore, even if some abnormality occurs to the control device for controlling the motor and the movable blade starts operation unintended by the user, it is possible to suppress the operation by the forced stop device provided separately from the control device.

The specific direction may be the second rotation direction. The second rotation direction is a direction in which the movable blade is rotated in the opening direction. Setting the second rotation direction as the specific direction can suppress unintended rotation of the movable blade in the closing direction.

The forced stop device may comprise a stop signal output unit, and a stop circuit. The stop signal output unit is configured to output a stop signal for stopping the motor when the abnormal state as described above is present. The stop circuit is configured to stop the motor by stopping power supply to the motor regardless of contents of the control signal while the stop signal is output from the stop signal output unit.

Individually providing a component that outputs the stop signal when abnormality occurs and a component that actually stops power supply to the motor based on the stop signal as above enables implementation of the simple and highly reliable forced stop device.

The stop signal output unit may be configured by a hardware circuit. Assuming that the function of the stop signal output unit is implemented by software processing of a computer, there is a possibility that abnormality in the software processing of the computer (so-called runaway or similar phenomenon) may occur. On the other hand, if the stop signal output unit is configured by a hardware circuit, abnormality as described above that is specific to software processing never occurs. Implementation of the highly reliable stop signal output unit can be achieved.

The stop signal output unit may comprise a first signal output section, a second signal output section, and a third signal output section. The first signal output section is configured to receive the operation signal output from the operation signal output device and output a first signal when the value of the operation signal is a value determined in the control device to rotate the motor in the specific rotation direction or to stop the motor. The second signal output section is configured to acquire actual operation information indicating an actual operating state of the motor, and output a second signal when the acquired actual operation information indicates that the motor is rotating in a direction opposite to the specific rotation direction. The third signal output section is configured to output the stop signal when the first signal is output from the first signal output section and the second signal is output from the second signal output section.

Dividing the stop signal output unit into three functional blocks this way enables implementation of the simple and efficient stop signal output unit.

The stop signal output unit may be configured to continue outputting the stop signal due to presence of the abnormal state until a specific condition is satisfied, and stop the output when the specific condition is satisfied.

According to the electric scissors configured as above, setting the specific condition as appropriate allows the motor stopped by the stop signal output to appropriately remain stopped, and the stopped state to be released at appropriate timing.

The specific condition can be set as appropriate. For example, the specific condition may be set to be a condition in which the operation device is operated in such a manner that the operation signal having a value determined in the control device to rotate the motor in a direction opposite to the specific direction is output from the operation signal output device.

Setting the specific condition as such allows the specific condition to be satisfied by voluntary operation of the operation device by the user and the motor to be released from the stopped state. Therefore, user-friendly electric scissors can be provided.

The stop circuit may comprise a switch section and a switch driving section. The switch section is provided separately from the driver circuit in a power supply path to the motor from a power source that supplies electric power to the motor and is configured to complete/interrupt the power supply path. The switch driving section is configured to cause the switch section to interrupt the power supply path while the stop signal is output from the stop signal output unit.

According to the electric scissors configured as above, the motor can be stopped with a simple configuration when the abnormal state is present.

Also, the stop circuit may be configured to stop power supply from the drive circuit to the motor by disabling the control signal input from the control device to the drive circuit while the stop signal is output from the stop signal output unit.

According to the electric scissors configured as above, there is no need to provide a component that can interrupt the power supply path separately from the drive circuit. Thus, cost saving is achieved.

The motor may be a direct current (DC) motor. That is, the DC motor is configured such that the motor is rotated as a DC voltage is applied to between a pair of terminals and that its rotation direction is switched by a polarity of the applied DC voltage. The forced stop device may be configured to be able to determine whether the motor is rotating in the direction opposite to the specific rotation direction, based on the DC voltage applied to the pair of terminals of the motor.

There are various ways to determine in which direction the motor is rotating. If the motor is a DC motor, the rotation direction can be determined based on the voltage applied to each of the pair of terminals. Therefore, determination of the rotation direction can be appropriately achieved with a simple configuration.

The drive circuit comprises an H-bridge circuit having four switching elements, and may be configured to apply a DC voltage from the H-bridge circuit to between the pair of terminals of the motor. Using the H-bridge circuit as the drive circuit allows switching of the rotation direction of the motor by an inexpensive configuration.

BRIEF DESCRIPTION OF THE DRAWINGS

Embodiments of the present disclosure will be illustrated with reference to the accompanying drawings, in which:

FIGS. 5A and 5B are explanatory diagrams respectively showing operation examples at normal time and at abnormal time, in the electric scissors according to the first embodiment;

FIGS. 7A and 7B are explanatory diagrams respectively showing operation examples at normal time and at abnormal time, in the electric scissors according to the second embodiment;

FIGS. 9A and 9B are explanatory diagrams respectively showing operation examples at normal time and at abnormal time, in the electric scissors according to the third embodiment.

DETAILED DESCRIPTION OF THE PREFERRED EMBODIMENTS

First Embodiment (1) Overall Configuration of Electric Scissors

Figures 1A, 1B:
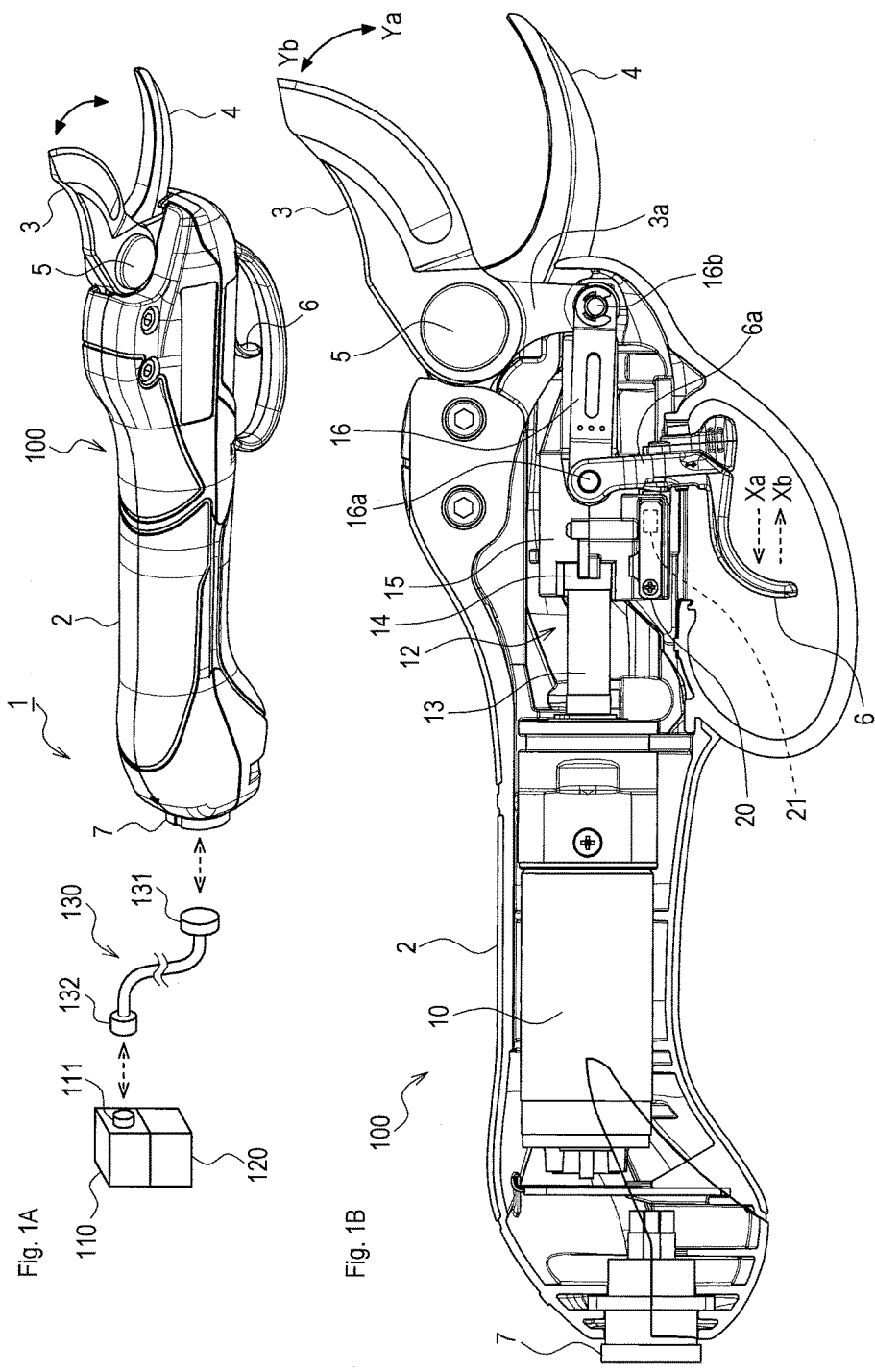
FIG. 1A is a perspective view of electric scissors of embodiments.
FIG. 1B is a side view showing an internal structure of a scissors body of the embodiments.

Electric scissors 1 of this embodiment shown in FIG. 1A are used mainly for pruning of trees, and are configured to be able to cut tree branches and peduncles, and other various cutting objects.

As shown in FIG. 1A, the electric scissors 1 comprise a scissors body 100, a control unit 110, and a battery unit 120. The scissors body 100 comprises a body housing 2, an upper blade 3, a lower blade 4, a trigger 6, and a connector 7. In FIG. 1A, the control unit 110, the battery unit 120 and a connecting cord 130 are shown simplified, different from their actual appearances, and their sizes relative to the scissors body 100 are also shown smaller than their actual sizes.

Figure 3:
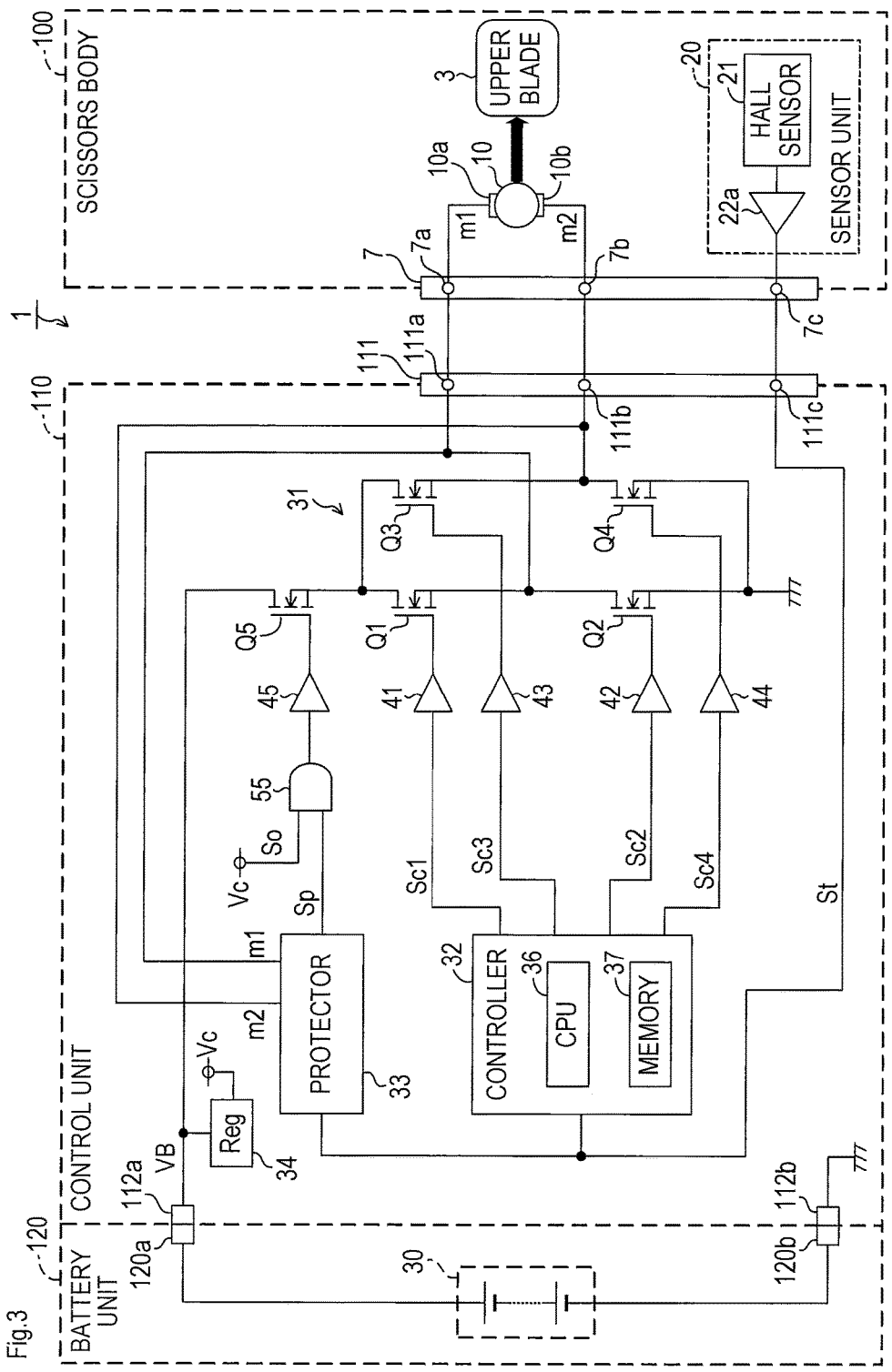
FIG. 3 is a block diagram showing an electrical configuration of the electric scissors of a first embodiment.

The battery unit 120 accommodates a battery 30 (see FIG. 3). The battery unit 120 is configured attachable to and detachable from the control unit 110. FIG. 1A shows the battery unit 120 attached to the control unit 110. When the battery unit 120 is mounted to the control unit 110, the battery 30 in the battery unit 120 and the control unit 110 are electrically connected.

The control unit 110 comprises a connector 111 to be electrically connected to the scissors body 100. The control unit 110 and the scissors body 100 can be connected by the connecting cord 130. The scissors body 100 and the control unit 110 are electrically connected when a plug 131 at one end of the connecting cord 130 is connected to a connector 7 of the scissors body 100, and a plug 132 at the other end of the connecting cord 130 is connected to the connector 111 of the control unit 110. The control unit 110 controls power supply from the battery 30 to the motor 10 inside the scissors body 100 (see FIG. 1B) to actuate the motor 10.

As shown in FIGS. 1A and 1B, the lower blade 4 of the scissors body 100 is fixed to the body housing 2. The upper blade 3 is rotatably supported on an upper blade support shaft 5 in a closing direction (direction of an arrow Ya in the figure) and in an opening direction (direction of an arrow Yb in the figure) that is opposite to the closing direction (see FIG. 1B). The closing direction is a direction in which the upper blade 3 is moved toward the lower blade 4 to narrow a gap therebetween. The opening direction is a direction in which the upper blade 3 is moved away from the lower blade 4 to expand the gap.

Rotation of the upper blade 3, as will be described later, is achieved using a rotational force of the motor 10. As the upper blade 3 is rotated by the rotational force of the motor 10, the upper blade 3 opens and closes with respect to the lower blade 4. Therefore, a cutting object can be cut by placing the cutting object between the upper blade 3 and the lower blade 4 and rotating the upper blade 3 in the closing direction.

In the following description, operation of rotating the upper blade 3 in the closing direction is referred to as "closing operation", and operation of rotating the upper blade 3 in the opening direction is referred to as "opening operation".

The trigger 6 is operated by a user of the electric scissors 1 to rotate or stop the upper blade 3. In the electric scissors 1, the motor 10 is rotated in a CW (clockwise) direction or a CCW (counterclockwise) direction, or is stopped, in accordance with an operation state of the trigger 6. Thereby, the upper blade 3 is to be opened or closed, or is stopped.

The body housing 2, as shown in FIG. 1B, accommodate various kinds of components and mechanisms for rotating the upper blade 3. The body housing 2 is gripped by the user when the user uses the electric scissors 1.

The plug 131 of the connecting cord 130 can be attached to and detached from the connector 7. When the scissors body 100 and the control unit 110 are connected by the connecting cord 130, and the battery unit 120 is mounted to the control unit 110, electric power is supplied from the battery 30 to the scissors body 100 and the scissors body 100 can be operated.

A configuration of separately providing the scissors body 100, the control unit 110 and the battery unit 120 is merely an example. For example, the control unit 110 and the battery unit 120 may be integrated. Further, for example, the scissors body 100 provided with the function of the control unit 110 may be configured to be connectable to the battery 30 by a cable or the like. Also, for example, the scissors body 100 may be provided with the functions of the battery 30 and the control unit 110. Further, for example, an adapter which converts commercial alternating current (AC) power into DC power may be used so that the DC power can be supplied from the adapter to the control unit 110. Other ways than the way described above may be used to supply electric power to the motor 10 inside the scissors body 100.

An internal configuration of the scissors body 100 will be described in more detail with reference to FIG. 1B. As shown in FIG. 1B, the scissors body 100 of the present embodiment comprises the motor 10, a ball screw unit 12, and a sensor unit 20 inside the body housing 2.

The motor 10 is a drive source for rotating the upper blade 3. The motor 10 is arranged so that its output shaft protrudes to the ball screw unit 12 side, and that a center axis of the output shaft is parallel to a back and forth direction of the scissors body 100. Note that the back and forth direction of the scissors body 100 means a right and left direction in FIG. 1B (direction indicated by arrows Xa and Xb in FIG. 1B). Further, in the following description, a term "forward" refers to the direction toward the upper blade 3 (direction indicated by the arrow Xb), and a term "backward" refers to the direction toward the connector 7 (direction indicated by the arrow—Xa), in the back and forth direction of the scissors body 100.

The rotational force of the motor 10 is transmitted to the upper blade 3 through a transmission mechanism comprising the ball screw unit 12 to be described later. Thereby, the upper blade 3 is rotated. Specifically, when the motor 10 rotates in the CW direction, opening operation of the upper blade 3 is performed, and, when the motor 10 rotates in the CCW direction, closing operation of the upper blade 3 is performed.

The ball screw unit 12 is a well known machine element for converting a rotational motion into a linear motion. The ball screw unit 12 comprises a screw shaft 13, a nut 14, and a nut housing 15.

The screw shaft 13 is arranged so that its axis is parallel to the back and forth direction of the scissors body 100. That is, the center axis of the output shaft of the motor 10 and the axis of the screw shaft 13 are parallel to each other. The output shaft of motor 10 and the screw shaft 13 are coupled via a coupling (not shown). When the motor 10 rotates (i.e., the output shaft of the motor 10 is rotated), the rotational force is transmitted to the screw shaft 13 to rotate the screw shaft 13.

The nut 14 is screwed into the screw shaft 13. A ball is placed between an external thread formed on the screw shaft 13 and an internal thread formed on an inner peripheral surface of the nut 14, as is well known. Thereby, the screw shaft 13 can be rotated with respect to the nut 14, with a relatively light force.

When the screw shaft 13 is rotated by the rotation of the motor 10, the nut 14 is moved in the back and forth direction. Specifically, when the motor 10 rotates in the CW direction, the nut 14 is moved forward, and when the motor 10 rotates in the CCW direction, the nut 14 is moved backward.

The nut housing 15 is integrally attached to the nut 14. Therefore, when the nut 14 is moved in the back and forth direction, the nut housing 15 is also moved in the back and forth direction together with the nut 14. One end of a coupling member 16 is rotatably attached to the front of the nut housing 15 via a first support shaft 16a. The other end of the coupling member 16 is coupled to an upper blade arm 3a, which is extended from the upper blade 3, via a second support shaft 16b. The upper blade 3 and the coupling member 16 are configured rotatable around the second support shaft 16b relative to each other.

With the configuration as above, for example, when the motor 10 rotates in the CW direction to rotate the screw shaft 13, and the nut 14 and the nut housing 15 are moved forward, the coupling member 16 is also moved forward to move the second support shaft 16b forward. As a result, the upper blade 3 is rotated in the opening direction (opening operation) about the upper blade support shaft 5. On the contrary, for example, when the motor 10 rotates in the CCW direction to rotate the screw shaft 13, and the nut 14 and the nut housing 15 are moved backward, the coupling member 16 is also moved backward to move the second support shaft 16b backward. Accordingly, the upper blade 3 is rotated in the closing direction (closing operation) about the upper blade support shaft 5.

A trigger arm 6a is extended integrally from the trigger 6. An end of the trigger arm 6a is rotatably supported via the first support shaft 16a with respect to the nut housing 15. The trigger arm 6a is biased to the front (direction of the arrow Xb) by a not shown spring. When the trigger 6 is not operated by the user and is released, the trigger 6 is in a specified initial position. FIG. 1B illustrates the trigger 6 in the initial position.

When the user pulls the trigger 6 (moves the trigger 6 in the arrow Xa direction), the trigger 6 is rotated about the first support shaft 16a to move backward. On the other hand, when the user reduces the force to pull the trigger 6, the trigger 6 is moved forward (arrow Xb direction) by the biasing force of the spring. Such an operation of reducing the force to pull the trigger 6 to move the trigger 6 forward is hereinafter referred to as return operation.

The sensor unit 20 is attached integrally to the nut housing 15. The sensor unit 20 comprises a Hall sensor 21 and a magnet 23 (see FIGS. 2A to 2C), and is configured so that the magnet 23 abuts to a plane on the back of the trigger arm 6a. When the trigger 6 is pulled or returned, a relative positional relationship between the Hall sensor 21 and the magnet 23 is changed. As a result, an analog signal having a value corresponding to the operation state of the trigger 6 is output from the Hall sensor 21. The sensor unit 20 is configured to amplify the analog signal output from the Hall sensor 21, and output the amplified analog signal as a trigger signal St. The trigger signal St output from the sensor unit 20 is input to the control unit 110 via the connecting cord 130.

Detailed structure of the sensor unit 20 and the relationship with the trigger arm 6a will be described with reference to FIGS. 2A to 2C. All of FIGS. 2A to 2C schematically show the inside of the sensor unit 20 viewed from a lower side (side where the trigger 6 is provided) of the scissors body 100.

Figure 2A:
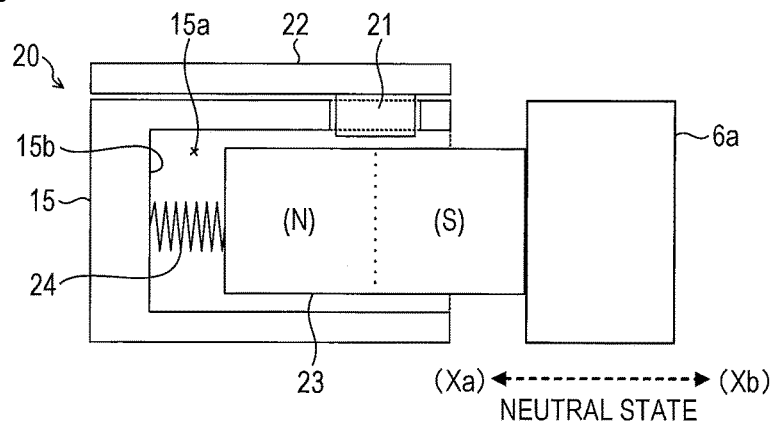
FIG. 2A is an explanatory view showing a magnet of a sensor unit in a neutral state.
Figure 2B:
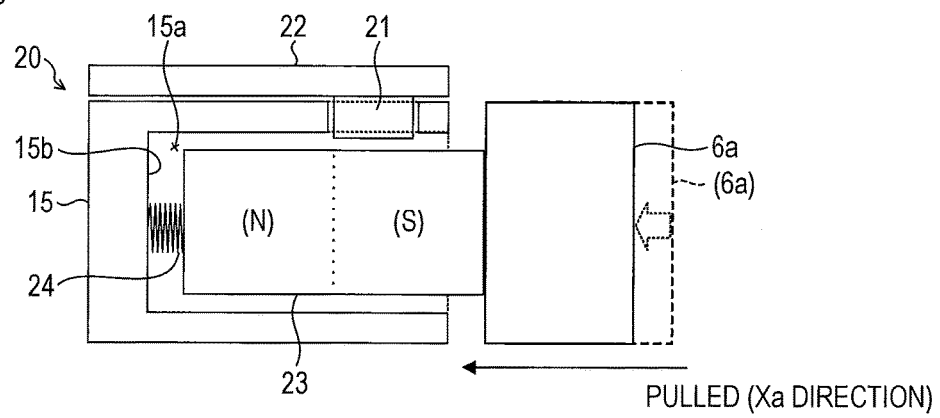
FIG. 2B is an explanatory view showing the magnet of the sensor unit being moved backward by pulling of a trigger.
Figure 2C:
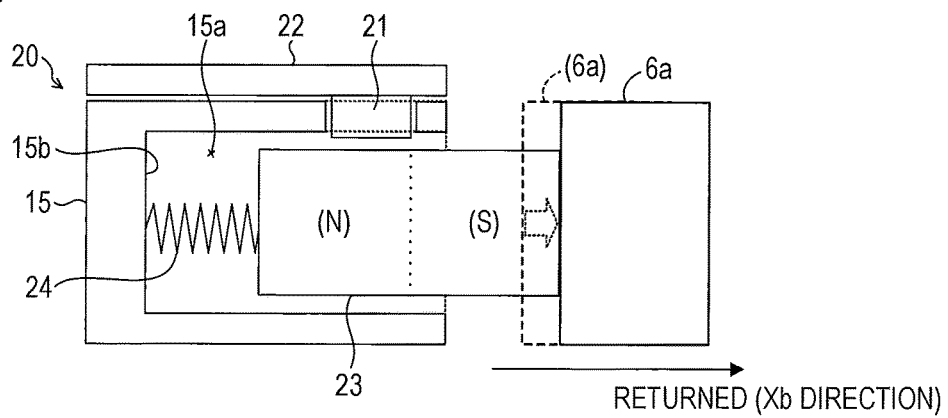
FIG. 2C is an explanatory view showing the magnet of the sensor unit being moved forward by returning of the trigger.

As shown in FIG. 2A, the sensor unit 20 comprises the Hall sensor 21, a sensor circuit board 22, the magnet 23, and a spring 24. The Hall sensor 21 is a semiconductor element that detects a magnetic field and output an analog signal having a value proportional to the magnitude of the magnetic field. The analog signal output from the Hall sensor 21 is amplified by an amplifier 22a (see FIG. 3) provided in the sensor circuit board 22. The amplified analog signal is then output as the trigger signal St.

The magnet 23 is accommodated in a housing section 15a formed in the nut housing 15. The housing section 15a is a bottomed cylindrical component of which front is open. One end of the spring 24 is coupled to a bottom 15b on the back of the housing section 15a, and the other end of the spring 24 is coupled to one end of the magnet 23 (end portion on N-pole side in the present embodiment).

That is, the magnet 23 is elastically supported by the spring 24 in the housing section 15a formed in the nut housing 15 and is configured to be moved in the back and forth direction. The other end of the magnet 23 (end portion on S-pole side in this embodiment) abuts on a surface on the back of the trigger arm 6a by a biasing force of the spring 24.

The sensor unit 20 is integral with the nut housing 15. Therefore, when the motor 10 rotates, the nut housing 15 is moved in the back and forth direction to open and close the upper blade 3, and also to move the sensor unit 20 in the back and forth direction.

FIG. 2A shows a state where an intermediate position (boundary position between the N and S poles) in the back and forth direction of the magnet 23 is close to an intermediate position in the back and forth direction of the Hall sensor 21. The state as such in which the intermediate position in the back and forth direction of the magnet 23 is located within a predetermined range including the intermediate position of the Hall sensor 21 is referred to as neutral state.

When the magnet 23 is in the neutral state, the trigger signal St output from the sensor unit 20 is a signal having a voltage value within a predetermined neutral range (from 2.3 V to 2.7 V in the present embodiment). Therefore, the neutral state, in other words, is a state where the magnet 23 is in a position at which the trigger signal St having a voltage value within the neutral range is output from the sensor unit 20.

In the present embodiment, when the trigger 6 is not operated by the user and is released and is in the initial position, the motor 10 is controlled so that the magnet 23 is in the neutral state. Also, when the trigger 6 is stationary although pulled backward from the initial position (hereinafter referred to as "pull holding state"), the motor 10 is controlled so that the magnet 23 is in the neutral state. That is, the motor 10 is controlled so that the magnet 23 approaches the neutral state, and stops when the magnet 23 is in the neutral state.

When the trigger 6 in the neutral state shown in FIG. 2A is pulled, the trigger arm 6a is moved backward (arrow Xa direction) while pushing the magnet 23, as shown in FIG. 2B. Thereby, the magnet 23 is moved backward against the biasing force of the spring 24. When the magnet 23 is moved backward of the neutral state and when the S pole of the magnet 23 is close to the Hall sensor 21, the trigger signal St output from the sensor unit 20 is a signal having a lower voltage value than the neutral range (less than 2.3 V in the present embodiment).

If the trigger 6 is pulled and the trigger signal St has a lower voltage value than the neutral range, the motor 10 is controlled to rotate in the CCW direction. Thereby, closing operation of the upper blade 3 is performed. When the motor 10 rotates in the CCW direction, the sensor unit 20 itself is also moved backward. Therefore, when the pulling operation of the trigger 6 is stopped, the sensor unit 20 is moved away from the trigger arm 6a, and the magnet 23 approaches the neutral state. When the magnet 23 is in the neutral state (i.e., value of the trigger signal St is a value within the neutral range), the rotation of the motor 10 is stopped. The closing operation of the upper blade 3 and the backward movement of the sensor unit 20 are stopped.

In the pull holding state where the trigger 6 is pulled backward from the initial state and is stationary, the magnet 23, as in a case of the initial state, is in the neutral state as shown in FIG. 2A. When the trigger 6 is returned from this pull holding state, the trigger arm 6a is moved forward (arrow Xb direction), as shown in FIG. 2C. This also moves the magnet 23 forward by the biasing force of the spring 24. When the magnet 23 is moved forward of the neutral state and the N pole of the magnet 23 approaches the Hall sensor 21 as such, the trigger signal St output from the sensor unit 20 is a signal having a higher voltage value than the neutral range (more than 2.7 V in the present embodiment).

If the trigger 6 is returned and the trigger signal St has a voltage value higher than the neutral range, the motor 10 is controlled to rotate in the CW direction. Thereby, opening operation of the upper blade 3 is performed. When the motor 10 rotates in the CW direction, the sensor unit 20 itself is also moved forward. Therefore, when the return operation of the trigger 6 is stopped, the sensor unit 20 approaches the trigger arm 6a, and thereby the magnet 23 approaches the neutral state. When the magnet 23 is in the neutral state (i.e., value of the trigger signal St has a value within the neutral range), the rotation of the motor 10 is stopped. The opening operation of the upper blade 3 and the forward movement of the sensor unit 20 are stopped.

(2) Electrical Configuration of Electric Scissors

Next, an electrical configuration of the electric scissors 1 will be described with reference to FIG. 3. FIG. 3 shows a state where the battery unit 120 is mounted to the control unit 110, and the control unit 110 and the scissors body 100 are coupled via the connecting cord 130. Illustration of the connecting cord 130 is omitted in FIG. 3. FIG. 3 shows electrical connection between the scissors body 100 and the control unit 110 by the connecting cord 130.

The battery 30 is accommodated in the battery unit 120. The battery unit 120 comprises a positive electrode terminal 120a and a negative electrode terminal 120b. The positive terminal 120a is connected to a positive pole of the battery 30, and the negative electrode terminal 120b is connected to a negative pole of the battery 30.

The control unit 110 has a positive input terminal 112a and a negative input terminal 112b for receiving electric power from the battery 30. When the battery unit 120 is attached to the control unit 110, the positive input terminal 112a of the control unit 110 and the positive terminal 120a of the battery unit 120 are connected, and the negative input terminal 112b of the control unit 110 and the negative terminal 120b of the battery unit 120 are connected.

Further, the connector 111 of the control unit 110 has a unit-side first terminal 111a, a unit-side second terminal 111b, and a unit-side third terminal 111c. The connector 7 of the scissors body 100 has a body-side first terminal 7a, a body-side second terminal 7b, and a body-side third terminal 7c.

When the scissors body 100 and the control unit 110 are connected by the connecting cord 130, the body-side first terminal 7a and the unit-side first terminal 111a are connected, the body-side second terminal 7b and the unit-side second terminal 111b are connected, and the body-side third terminal 7c and the unit-side third terminal 111c are connected.

The scissors body 100 comprises the motor 10 and the sensor unit 20 as electrical components.

The motor 10 of the present embodiment is a DC motor. That is, the motor 10 has a pair of terminals 10a and 10b for receiving electric power for driving. In the pair of terminals 10a and 10b, the first terminal 10a is connected to the body-side first terminal 7a of the connector 7, and the second terminal 10b is connected to the body-side second terminal 7b of the connector 7. Application of a DC voltage to between the pair of terminals 10a and 10b causes the motor 10 to rotate. Further, the rotation direction of the motor 10 is switched by a polarity of the DC voltage applied to between the pair of terminals 10a and 10b.

The sensor unit 20, as previously described, comprises the Hall sensor 21. The sensor unit 20 also comprises the amplifier 22a. The amplifier 22a amplifies the analog signal output from the Hall sensor 21. An output terminal of the amplifier 22a is connected to the body side third terminal 7c of the connector 7. Therefore, the signal amplified by the amplifier 22a is output to the control unit 110, as the trigger signal St.

Now, a description will be given on various circuits and the like mounted to the control unit 110. The control unit 110 comprises an H-bridge circuit 31, a controller 32, a protection unit 33, and a regulator 34.

The regulator 34 steps down a battery voltage, which is a voltage of the battery 30, to generate and output a DC control voltage Vc having a predetermined voltage value (for example, 5 V). The control voltage Vc output from the regulator 34 is used as a power source for driving each section of the control unit 110.

The H-bridge circuit 31 has a first switch Q1, a second switch Q2, a third switch Q3, and a fourth switch Q4. These four switches Q1 to Q4 are individually turned on and off to actuate the motor 10. The four switches Q1 to Q4 that make up the H-bridge circuit 31 in the present embodiment are N-channel MOSFETs.

In the H-bridge circuit 31, a source of the first switch Q1 and a drain of the second switch Q2 are connected to the unit-side first terminal 111a of the connector 111. Therefore, the source of the first switch Q1 and the drain of the second switch Q2 are connected to the first terminal 10a out of the pair of terminals 10a and 10b of the motor 10. Further, a source of the third switch Q3 and a drain of the fourth switch Q4 are connected to the unit-side second terminal 111b of the connector 111. Therefore, the source of the third switch Q3 and the drain of the fourth switch Q4 are connected to the second terminal 10b out of the pair of terminals 10a and 10b of the motor 10.

A source of the second switch Q2 and a source of the fourth switch Q4 are connected to a ground line having a reference potential. A drain of the first switch Q1 and a drain of the third switch Q3 are connected to the positive input terminal 112a via a path switch Q5. The ground line is connected to the negative input terminal 112b.

The four switches Q1 to Q4 that make up the H-bridge circuit 31 are individually turned on and off by the controller 32. Specifically, a first control signal Sc1 output from the controller 32 is input to a gate of the first switch Q1 through a first buffer 41. A second control signal Sc2 output from the controller 32 is input to a gate of the second switch Q2 through a second buffer 42. A third control signal Sc3 output from the controller 32 is input to a gate of the third switch Q3 through a third buffer 43. A fourth control signal Sc4 output from the controller 32 is input to a gate of the fourth switch Q4 through a fourth buffer 44. Each of the control signals Sc1 to Sc4 is a binary signal of High level (hereinafter referred to as "H level") or Low level (hereinafter referred to as "L level").

The path switch Q5 has a drain connected to the positive input terminal 112a, a source connected to the drain of the first switch Q1 and the drain of the third switch Q3. An output signal of an AND circuit 55 is input to the gate of the path switch Q5 via a fifth buffer 45. The path switch Q5, in the present embodiment, is an N-channel MOSFET. The AND circuit 55 provided upstream of the fifth buffer 45 is hereinafter referred to as protective AND circuit 55.

The switches Q1 to Q5 may be switching elements other than N-channel MOSFETs. More specifically, the switches Q1 to Q5 may be, for example, IGBTs (Insulated Gate Bipolar Transistors), GTOs (gate turn-off thyristors), triacs and the like. Further, use of semiconductor switching elements as the switches Q1 to Q5 is not essential. Other switching elements may be used that can complete/interrupt a current path.

Two signals of a power input signal So and a protection signal Sp are input to the protective AND circuit 55, and a logical product of these two signals So and Sp is output.

The protection signal Sp is input from the protection unit 33. The protection signal Sp is a H level signal at normal time when no abnormal state to be described later is present. When an abnormal state is present, the protection signal Sp becomes a L level signal, and the L level is maintained until a specific condition to be described later is satisfied.

The power input signal So is the control voltage Vc generated by the regulator 34. That is, the control voltage Vc is input to the protective AND circuit 55 as the power input signal So. Therefore, when the regulator 34 operates normally (i.e., when the control voltage Vc is generated normally), the power input signal So input to the protective AND circuit 55 is treated as a H level input signal in the protective AND circuit 55. On the other hand, when the regulator 34 is stopped or when the control voltage Vc is not generated normally (for example, when the voltage value is lower than a predetermined level), the power input signal So input to the protective AND circuit 55 is treated as a L level input signal in the protective AND circuit 55.

Thus, while the regulator 34 operates normally, both the two signals So and Sp input to the protective AND circuit 55 are of H level, as long as the abnormal state is not present. The path switch Q5 is turned on, and a power supply path from the positive electrode of the battery 30 to the H-bridge circuit 31 is completed.

The trigger signal St from the sensor unit 20 is input to the controller 32. The controller 32, based on the value of the trigger signal St, determines whether to rotate the motor 10 in the CW direction or in the CCW direction, or to stop the motor 10. According to the determination result, each of the control signals Sc1 to Sc4 is output.

Specifically, as shown in FIG. 5A, the controller 32 outputs each of the control signals Sc1 to Sc4 as L level signal, for example, when the value of the trigger signal St is within the neutral range (from 2.3 V to 2.7 V in the present embodiment) due to such as the trigger 6 being released or being stationary during the pulling operation. As a result, the four switches Q1 to Q4 of the H-bridge circuit 31 are all turned off. Power supply to the motor 10 from the battery 30 is stopped to stop the motor 10. Therefore, the upper blade 3 is stopped.

On the other hand, for example, when the value of the trigger signal St is lower than the neutral range (less than 2.3 V in the present embodiment), due to such as pulling of the trigger 6, the controller 32 turns the first control signal Sc1 and the fourth control signal Sc4 to H level, as shown in FIG. 5A. Thus, the first switch Q1 and the fourth switch Q4 out of the four switches Q1 to Q4 of the H-bridge circuit 31 are turned on, the positive electrode of the battery 30 is connected to the first terminal 10a of the motor 10 so that the ground line is connected to the second terminal 10b. Therefore, electric power is supplied from the battery 30 to the motor 10 to rotate the motor 10 in the CCW direction. Thus, closing operation of the upper blade 3 is performed.

To the contrary, for example, when the value of the trigger signal St is higher than the neutral range (higher than 2.7 V in the present embodiment), due to such as the trigger 6 being returned, the controller 32 turns the second control signal Sc2 and the third control signal Sc3 to H level, as shown in FIG. 5A. Thus, the second switch Q2 and the third switch Q3 out of the four switches Q1 to Q4 of the H-bridge circuit 31 are turned on. The positive electrode of the battery 30 is connected to the second terminal 10b of the motor 10 so that the ground line is connected to the first terminal 10a. Therefore, electric power is supplied from the battery 30 to the motor 10 to rotate the motor 10 in the CW direction. Thus, opening operation of the upper blade 3 is performed.

The controller 32 is configured as a microcomputer comprising a CPU 36 and a memory 37. Various functions of the controller 32 are implemented by the CPU 36 that reads programs of the various functions from the memory 37 for execution. The function of controlling power supply to the motor 10 by outputting the control signals Sc1 to Sc4 based on the value of the trigger signal St described above is one of so-called software processing implemented by the CPU 36 that reads from the memory 37 and execute the corresponding program.

The protection unit 33 is a component for forcibly stopping the motor 10 by turning the protection signal Sp to L level when the abnormal state is present. The trigger signal St from the sensor unit 20 is input to the protection unit 33. Further, a voltage of the first terminal 10a of the motor 10 is input as a first motor signal m1, and a voltage of the second terminal 10b of the motor 10 is input as a second motor signal m2, in the protection unit 33.

The protection unit 33 outputs a L-level signal for stopping the motor 10 as the protection signal Sp, thereby to forcibly stop the motor 10, when the abnormal state is present in which the value of the trigger signal St is a value determined in the controller 32 to rotate the motor 10 in the specific rotation direction or to stop the motor 10, and the motor 10 is actually rotating in a direction opposite to the specific rotation direction.

The specific rotation direction, in the present embodiment, is a direction in which the upper blade 3 is to be opened. Therefore, the specific rotation direction in the present embodiment is the CW direction. That is, in the present embodiment, the abnormal state is a state in which the motor 10 is actually rotating in the CCW direction although the value of the trigger signal St is a value determined in the controller 32 either to rotate the motor 10 in the CW direction or to stop the motor 10 (value of 2.3 V or higher). In other words, the abnormal state, in essence, is a state in which closing operation of the upper blade 3 is actually performed, although the value of the trigger signal St is a value in which the upper blade 3 is to be opened or stopped by the controller 32. When this abnormal state is present, closing operation of the upper blade 3 is performed although the user has no intention to close the upper blade 3.

Therefore, the protection unit 33, when the abnormal state is present, turns the protection signal Sp to L level to forcibly stop the motor 10, thereby stopping the closing operation of the upper blade 3. While the protection signal Sp is L level, the path switch Q5 remains turned off. Thus, regardless of control contents of the switches Q1 to Q4 by the controller 32, power supply to the motor 10 continues to be stopped.

The L level state of the protection signal Sp continues until a specific condition is satisfied. The specific condition, in the present embodiment, is to pull the trigger 6 (i.e., output of the trigger signal St having a lower value than the neutral range). When the specific condition is satisfied, the protection signal Sp becomes H level, and the motor 10 is again operated in accordance with the control signals Sc1 to Sc4 from the controller 32.

Figure 4:
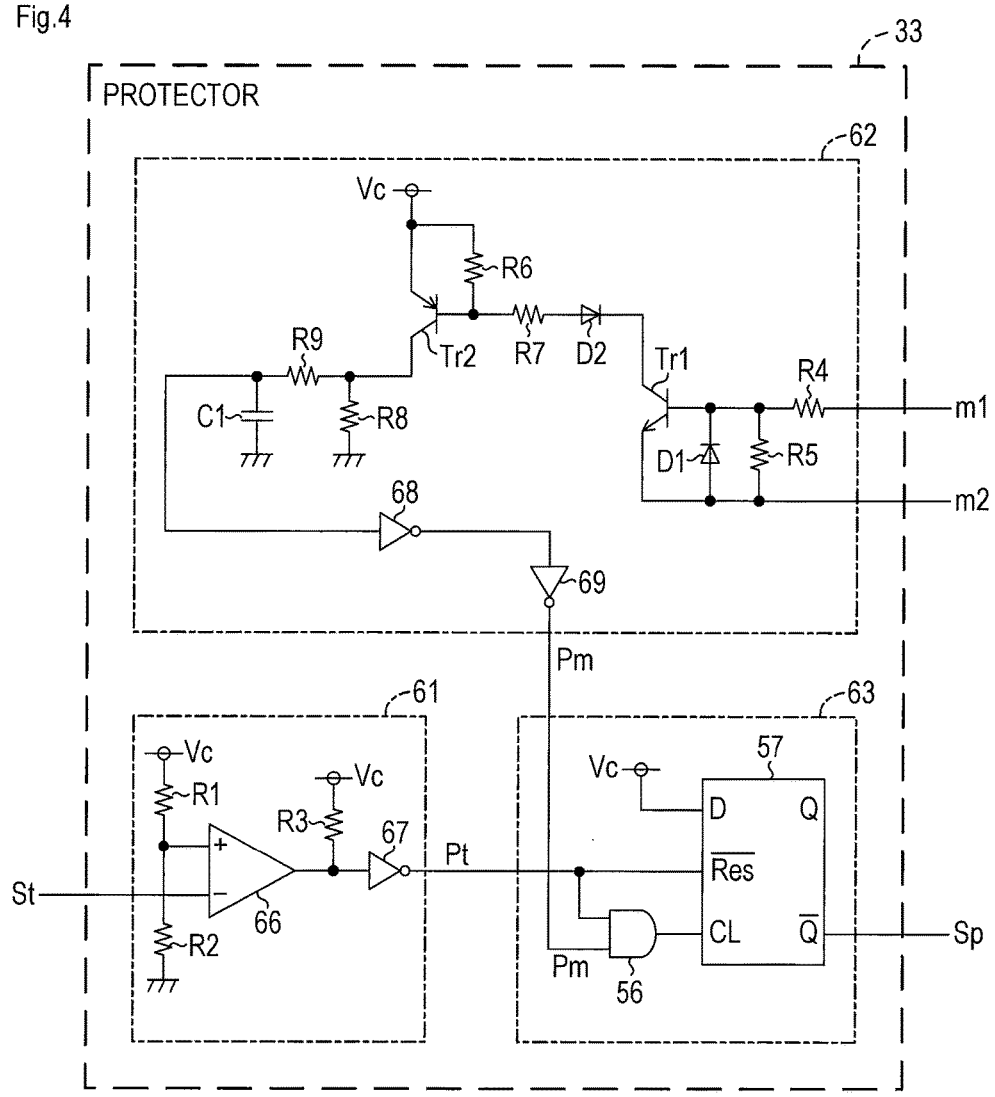
FIG. 4 is an electrical circuit diagram of a protection unit of the first embodiment.

The protection unit 33, in the present embodiment, is configured by a hardware circuit. An internal configuration of the protection unit 33 will be described with reference to FIG. 4. As shown in FIG. 4, the protection unit 33 comprises a trigger state detector 61, a motor state detector 62, and a protection determination section 63.

The trigger state detector 61 receives the trigger signal St output from the sensor unit 20, and outputs a trigger state detection signal Pt corresponding to the value of the input trigger signal St. Specifically, the trigger state detector 61 comprises a comparator 66. The trigger signal St is input to an inverting input terminal of the comparator 66. To a non-inverting input terminal of the comparator 66, a voltage (2.3 V in the present embodiment) acquired by dividing the control voltage Vc by a resistor R1 and a resistor R2 is input as a threshold value.

This threshold value is for specifying whether the value of the trigger signal St is a value determined in the controller 32 to rotate the motor 10 in the CW direction or stop the motor 10, or to rotate the motor 10 in the CCW direction. In the present embodiment, the controller 32 is configured to rotate the motor 10 in the CCW direction when the value of the trigger signal St is less than 2.3 V. Therefore, the threshold value input to the non-inverting input terminal of the comparator 66 is set to be 2.3 V.

If the value of the trigger signal St is equal to or more than the threshold value, a L-level signal is output from the comparator 66. If the value of the trigger signal St is less than the threshold value, a H-level signal is output from the comparator 66.

The output terminal of the comparator 66 is pulled up to the control voltage Vc through a resistor R3, and is input to a NOT circuit 67. When the output signal of the comparator 66 is L level, an output signal of the NOT circuit 67 is H level. When the output signal of the comparator 66 is H level, the output signal of the NOT circuit 67 is L level. The output signal of the NOT circuit 67 is output from the trigger state detector 61 as the trigger state detection signal Pt.

Accordingly, as shown in FIG. 5B, when the value of the trigger signal St is within or higher than the neutral range (that is, 2.3 V or more), the trigger state detection signal Pt output from the trigger state detector 61 becomes H level. On the other hand, when the value of the trigger signal St is lower than the neutral range (that is, less than 2.3 V), the trigger state detection signal Pt output from the trigger state detection unit 61 becomes L level.

The motor state detector 62 acquires actual operation information indicating the actual operating state of the motor 10, and outputs a motor state detection signal Pm corresponding to the acquired actual operation information. Specifically, the motor state detector 62 receives, as actual operation information, the first motor signal m1 which is the voltage of the first terminal 10a of the motor 10 and the second motor signal m2 which is the voltage of the second terminal 10b of the motor 10. The first motor signal m1 is input to a base of a first transistor Tr1 through a resistor R4. The second motor signal m2 is input to an emitter of the first transistor Tr1. A resistor R5 is connected to between the base and the emitter of the first transistor Tr1. A diode D1 is also connected in a direction opposite to between the base and the emitter of the first transistor Tr1.

A cathode of a diode D2 is connected to a collector of the first transistor Tr1. An anode of the diode D2 is connected to a base of the second transistor Tr2 via a resistor R7. It is to be noted that the first transistor Tr1 is an NPN bipolar transistor, and the second transistor Tr2 is a PNP bipolar transistor.

The control voltage Vc is applied to an emitter of the second transistor Tr2. A resistor R6 is connected to between the base and the emitter of the second transistor Tr2. A collector of the second transistor Tr2 is connected to one ends of a resistor R8 and a resistor R9. The other end of the resistor R8 is connected to the ground line. The other end of the resistor R9 is connected to the ground line via a capacitor C1. A voltage at the other end of the resistor R9 is output through two NOT circuits 68 and 69 connected in series, as the motor state detection signal Pm.

With the configuration as such, as shown in FIGS. 5A and 5B, when the motor 10 rotates in the CW direction, the voltage level of the first motor signal m1 is L level and the voltage level of the second motor signal m2 is H level. Thus, the first transistor Tr1 is turned off. Further, even when the motor 10 is stopped, the first transistor Tr1 is turned off, because both the voltage levels of the motor signals m1 and m2 are L level.

Therefore, when the motor 10 rotates in the CW direction or is stopped, the second transistor Tr2 is turned off. The voltage level at the other end of the resistor R9 is L level. The motor state detection signal Pm which is output through the two NOT circuits 68 and 69 is L level.

On the other hand, when the motor 10 rotates in the CCW direction, the voltage level of the first motor signal m1 is H level and the voltage level of the second motor signal m2 is L level. Thus, the first transistor Tr1 is turned on and also the second transistor Tr2 is turned on. Therefore, the voltage level of the other end of the resistor R9 is H level. The motor state detection signal Pm which is output via the two NOT circuits 68 and 69 is H level.

The protection determination section 63 comprises an AND circuit 56, and a D-type flip-flop (hereinafter referred to as "D-FF") 57 having a reset terminal. The AND circuit 56 receives the trigger state detection signal Pt from the trigger state detector 61, and the motor state detection signal Pm from the motor state detector 62, and outputs a logical product of the input signals Pt and Pm. The output signal of the AND circuit 56 is input to a clock input terminal of the D-FF 57.

The trigger state detection signal Pt is input to the inverted reset input terminal of the D-FF 57. The control voltage Vc is input to a data input terminal of the D-FF 57. Therefore, if the regulator 34 operates normally (i.e., if the control voltage Vc is generated normally), the input signal input to the data input terminal of the D-FF 57 is treated as a H level input signal in the D-FF 57.

A signal output from the inverted output terminal of the D-FF 57 is output as the protection signal Sp from the protection determination section 63. The protection signal Sp, as previously described, is output from the protection unit 33, and input to the protective AND circuit 55. The D-FF 57 is reset once after activation, so the protection signal Sp output from the inverted output terminal is H level. Until a clock signal CL input to the clock input terminal is raised from L level to H level, the protection signal Sp remains H level.

With the configuration as such, when the controller 32 is operating normally based on the trigger signal St, the protection signal Sp remains H level, as shown in FIGS. 5A and 5B. That is, for example, if the trigger 6 is stopped, the motor 10 is stopped in a state where the magnet 23 of the sensor unit 20 is in the neutral state. Therefore, the value of the trigger signal St is a value within the neutral range (from 2.3 V to 2.7 V), and the trigger state detection signal Pt becomes H level. Further, both the first motor signal m1 and the second motor signal m2 become L level, and the motor state detection signal Pm becomes L level. Therefore, the clock signal CL input from the AND circuit 56 to the clock input terminal of D-FF 57 is L level, and the protection signal Sp output from the inverted output terminal remains H level.

Also, for example, when the trigger 6 is pulled, the value of the trigger signal St becomes lower than the neutral range, and the motor 10 rotates in the CCW direction. Therefore, the trigger state detection signal Pt becomes L level. Further, the first motor signal m1 becomes H level, the second motor signal m2 becomes L level, and the motor state detection signal Pm becomes H level. Therefore, the clock signal CL input from the AND circuit 56 to the clock input terminal of the D-FF 57 is L level, and the protection signal Sp output from the inverted output terminal remains H level.

Also for example, when the trigger 6 is returned, the value of the trigger signal St becomes higher than the neutral range, and the motor 10 rotates in the CW direction. Therefore, the trigger state detection signal Pt becomes H level. Further, the first motor signal m1 becomes L level, the second motor signal m2 becomes H level, and the motor state detection signal Pm becomes L level. Therefore, the clock signal CL input from the AND circuit 56 to the clock input terminal of D-FF 57 is L level, and the protection signal Sp output from the inverted output terminal remains H level.

It is assumed that abnormal software processing (so-called runaway) and other anomalies, failures or the like occurs in the controller 32, and that the motor 10 rotates in the CCW direction and closing operation of the upper blade 3 is unintentional performed although the trigger 6 is not pulled (that is, the trigger 6 is returned or stopped). This means that the abnormal state is present in which, although the value of the trigger signal St is the value determined in the controller 32 to rotate the motor 10 in the CW direction or to stop the motor 10 (2.3 V or more), the motor 10 is actually rotating in the CCW direction.

In this case, as shown in FIGS. 5A and 5B, the trigger state detection signal Pt is H level. Moreover, the fact that the motor 10 has actually started to rotate in the CCW direction means the first motor signal m1 is H level and the second motor signal m2 is L level. Therefore, the motor state detection signal Pm is changed from L level to H level. Thus, the output signal, i.e. the clock signal CL input to the clock input terminal of D-FF 57 of the AND circuit 56, is changed from L level to H level.

As a result, the protection signal Sp output from the inverted output terminal of the D-FF 57 is changed from H level to L level. Then, the path switch Q5 is forced off, and power supply to the motor 10 is stopped thereby to stop the motor 10.

When the motor 10 is stopped as such, since the first motor signal m1 and the second motor signal m2 both are L level, the motor state detection signal Pm is changed again to L level. As a result, the clock signal is also changed to L level. However, as long as the trigger signal St is equal to or more than 2.3 V, the trigger state detection signal Pt still remains H level. Thus, the D-FF 57 is not reset, and the protection signal Sp is latched at L level.

Then, when the specific condition is satisfied, i.e., when the trigger 6 is pulled and the value of the trigger signal St is less than 2.3 V, the trigger state detection signal Pt becomes L level, the D-FF 57 is reset, the latch of the L-level protection signal Sp is released, and the protection signal Sp is changed to H level. When the protection signal Sp is changed to H level, the path switch Q5 is turn on and the power supply path from the battery 30 to the H-bridge circuit 31 is completed. Thus, the motor 10 again becomes operable in accordance with the control signals Sc1 to Sc4 from the controller 32. In the present embodiment, the latch is released by pulling the trigger 6. Thus, when the latch is released and if the controller 32 can operate normally, the motor 10 rotates in the CCW direction and closing operation of the upper blade 3 is performed.

(3) Effects of First Embodiment

According to the electric scissors 1 of the first embodiment described above, when the motor 10 actually rotates in the CCW direction (i.e., closing operation of the upper blade 3 is performed) although the trigger signal St output from the sensor unit 20 is a signal having a value determined in the controller 32 to rotate the motor 10 in the CW direction (i.e., perform opening operation of the upper blade 3) or to stop the motor 10 (i.e., the user has no intention to close the upper blade 3), the L level protection signal Sp is output from the protection unit 33. Thereby, rotation in the CCW direction is stopped.

Therefore, even if some abnormality occurs to the controller 32 and the upper blade 3 starts operation unintended by the user, the protection unit 33 provided separately from the controller 32 can suppress the operation.

In particular, in the present embodiment, unintentionally started closing operation of the upper blade 3 can be suppressed. Therefore, unintentional cut of a cutting object caused by abnormality, etc. in the controller 32 can be suppressed.

Further, the protection unit 33 of the present embodiment is configured by a hardware circuit. Assuming that the function of the protection unit 33 is implemented by software processing by a computer, there is a possibility that abnormal software processing of the computer (so-called runaway or similar phenomenon) may occur. On the other hand, if the protection unit 33 is configured by a hardware circuit like the present embodiment, abnormality inherent to software processing as described above does not occur. Implementation of the reliable protection unit 33 can be achieved.

Further, the protection unit 33 specifically comprises the trigger state detector 61, the motor state detector 62, and the protection determination section 63. That is, there are a functional block that performs signal processing based on the trigger signal St, a functional block that performs signal processing based on the rotation direction of the motor 10, and a functional block for final determination of whether to stop the motor 10 based on processing results of the two functional blocks. Therefore, the protection unit 33 configured as such can suppress a design load of the protection unit 33, and can be inexpensively and efficiently implemented.

Further, if the protection signal Sp from the protection unit 33 becomes L level due to presence of an abnormal state, the L level state is maintained until the specific condition is satisfied. In the present embodiment, pulling of the trigger 6 is set as the specific condition. Therefore, the stopped state of the motor 10 can be properly maintained after presence of the abnormal state, and the stopped state can be released at the right timing based on the user intention.

In the first embodiment, the upper blade 3 corresponds to an example of a movable blade. The trigger 6 corresponds to an example of an operation device. Further, the trigger signal St corresponds to an example of an operation signal. The ball screw unit 12 and the coupling member 16 correspond to an example of a transmission mechanism. The sensor unit 20 corresponds to an example of an operation signal output device. Of the rotation directions of the motor 10, the CW direction corresponds to a second rotation direction, and the CCW direction corresponds to a first rotation direction. The H-bridge circuit 31 corresponds to an example of a drive circuit. The protection unit 33 corresponds to an example of a stop signal output unit. The protective AND circuit 55 and the path switch Q5 correspond to an example of a stop circuit. The L level protection signal Sp corresponds to an example of a stop signal. The path switch Q5 also corresponds to an example of a switch section. The protective AND circuit 55 corresponds to an example of a switch driving section. In the protection unit 33, the trigger state detector 61 corresponds to an example of a first signal output section, the H level trigger state detection signal Pt corresponds to an example of a first signal, the motor state detector 62 corresponds to an example of a second signal output section, the H-level motor state detection signal Pm corresponds to an example of a second signal, and the protection determination section 63 corresponds to an example of a third signal output section.

Second Embodiment

Figure 6:
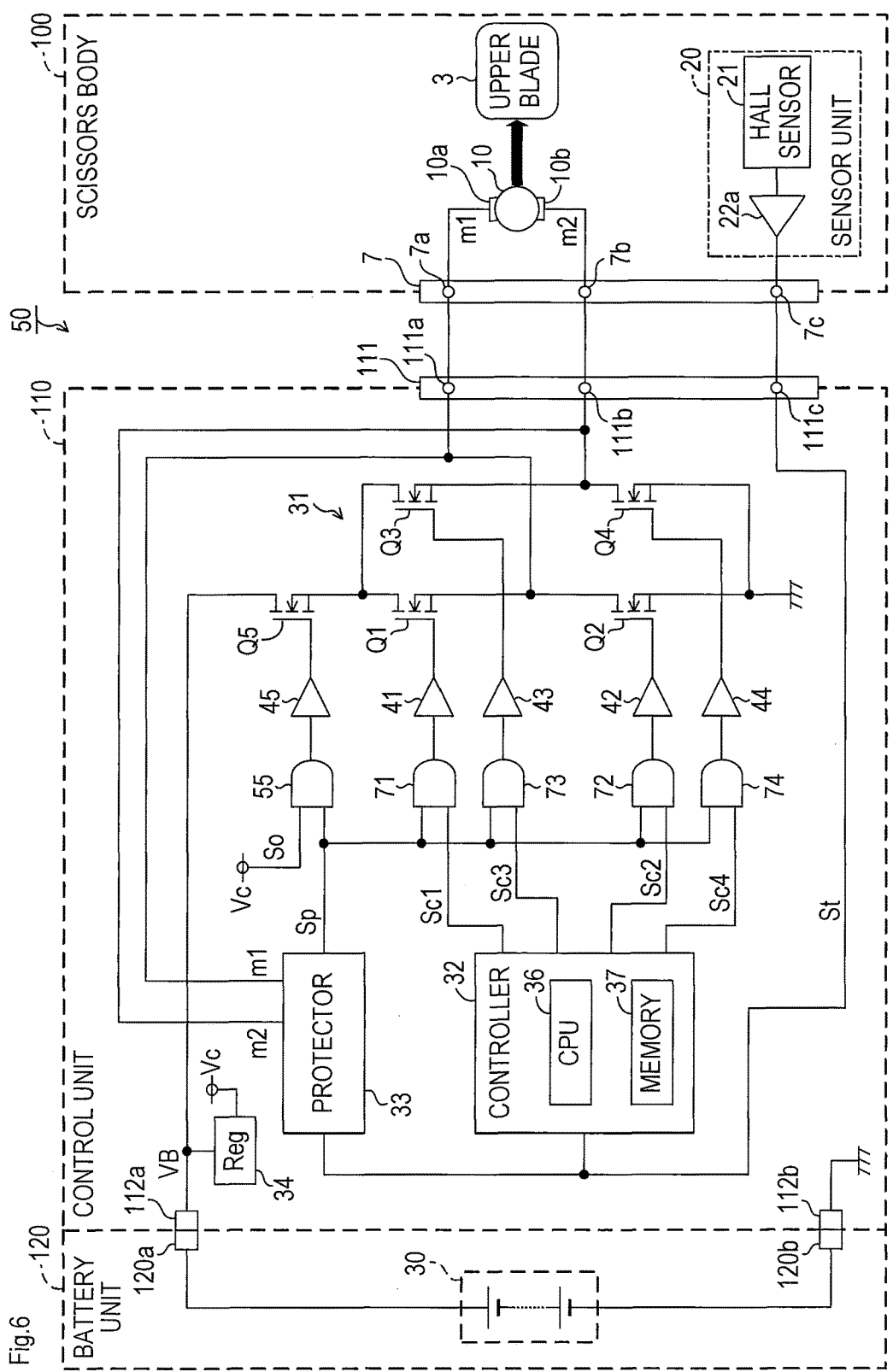
FIG. 6 is a block diagram showing an electrical configuration of the electric scissors of a second embodiment.

With reference to FIG. 6, electric scissors 50 of the second embodiment will be described. The electric scissors 50 of the second embodiment have the same structure as the electric scissors 1 of the first embodiment shown in FIG. 3, except for some components. Therefore, explanation on the components common to those of the electric scissors 1 of the first embodiment will not be repeated. Differences from the electric scissors 1 of the first embodiment will be mainly described.

In the first embodiment described above, the control signals Sc1 to Sc4 from the controller 32 are input to the buffers 41 to 44, respectively. In the second embodiment, AND circuits 71 to 74 are provided upstream of the buffer 41 to 44, respectively.

The first AND circuit 71 provided upstream of the first buffer 41 receives the first control signal Sc1 from the controller 32 and the protection signal Sp from the protection unit 33. A logical product of these input signals Sc1 and Sp is input to the first buffer 41.

The second AND circuit 72 provided upstream of the second buffer 42 receives the second control signal Sc2 from the controller 32 and the protection signal Sp from the protection unit 33. A logical product of these input signals Sc2 and Sp is input to the second buffer 42.

The third AND circuit 73 provided upstream of the third buffer 43 receives the third control signal Sc3 from the controller 32 and the protection signal Sp from the protection unit 33. A logical product of these input signals Sc3 and Sp is input to the third buffer 43.

The fourth AND circuit 74 provided upstream of the fourth buffer 44 receives the fourth control signal Sc4 from the controller 32 and the protection signal Sp from the protection unit 33. A logical product of these input signals Sc4 and Sp is input to the fourth buffer 44.

With the configuration as such, while the controller 32 normally controls power supply to the motor 10 based on the trigger signal St, the protection signal Sp from the protection unit 33 remains H level. Thus, the switches Q1 to Q4 of the H-bridge circuit 31 are turned on and off in accordance with the control signals Sc1 to Sc4 from the controller 32, respectively.

On the other hand, when an abnormal state is present, the protection signal Sp becomes L level. The L level protection signal Sp is not only input to the protective AND circuit 55, but also input to the AND circuits 71 to 74 provided upstream of the buffer 41 to 44, in the second embodiment.

Therefore, as shown in FIG. 7A, when the protection signal Sp becomes L level, not only the path switch Q5 is turned off, but the four switches Q1 to Q4 that make up the H bridge circuit 31 are also forcibly turned off regardless of the control signals Sc1 to Sc4 from the controller 32. That is, the control signals Sc1 to Sc4 from the controller 32 are disabled.

FIG. 7A differs from FIG. 5A in that, when the abnormal state is present in which closing operation of the upper blade 3 is unintentionally performed, not only the path switch Q5 is changed from on to off by the L level protection signal Sp but also the first switch Q1 and the fourth switch Q4 are changed from on to off. Other points are the same as those in FIG. 5A. FIG. 7B is exactly the same as FIG. 5B.

When the protection signal Sp becomes L level, the L level is latched until the specific condition (pulling of the trigger 6 in the present embodiment as well) is satisfied, as in the first embodiment, during which the five switches Q1 to Q5 are all forced off. Then, when the specific condition is satisfied, the latch of the protection signal Sp is released and the protection signal Sp becomes H level, the path switch Q5 is turned on, and the control signal Sc1 to Sc4 from the controller 32 to the switches Q1 to Q4 of the H-bridge circuit 31 become effective.

According to the electric scissors 50 of the second embodiment described above, in addition to the effect of the first embodiment described above, the following effect can be obtained. That is, according to the electric scissors 50 of the second embodiment, when an abnormality occurs, unintended closing operation of the upper blade 3 can be more reliably suppressed, because the five switches Q1 to Q5 are all forced off.

In the second embodiment, the first AND circuit 71, the second AND circuit 72, the third AND circuit 73, and the fourth AND circuit 74 correspond to an example of a stop circuit.

Third Embodiment

Electric scissors of the third embodiment has the same structure as the electric scissors 50 of the second embodiment, except for the protection unit.

In the electric scissors 50 of the second embodiment, the abnormal state to forcibly stop the motor 10 is set for the purpose of suppressing unintentional closing operation of the upper blade 3 due to malfunction of the controller 32. That is, in the second embodiment, the abnormal state to forcibly stop rotation of the motor 10 is the state in which the motor 10 is actually rotating in the CCW direction although the value of the trigger signal St is the value (2.3 V or more) determined in the controller 32 to rotate the motor 10 in the CW direction or to stop the motor 10.

In the third embodiment, the abnormal state is set for the purpose of suppressing unintentional opening operation of the upper blade 3 due to malfunction of the controller 32. That is, an abnormal state in the third embodiment is a state in which the motor 10 is actually rotating in the CW direction although the value of the trigger signal St is the value (less than 2.7 V) determined in the controller 32 to rotate the motor 10 in the CCW direction or to stop the motor 10. In other words, the abnormal state that is set in the third embodiment, in essence, is a state in which opening operation of the upper blade 3 is actually performed although the value of the trigger signal St is the value in which the upper blade 3 is to be closed or stopped by the controller 32. When this abnormal state is present, the upper blade 3 is in opening operation although the user has no intention to open the upper blade 3. In the third embodiment, when such an abnormal state is present, the protection signal Sp is changed to L level.

Figure 8:
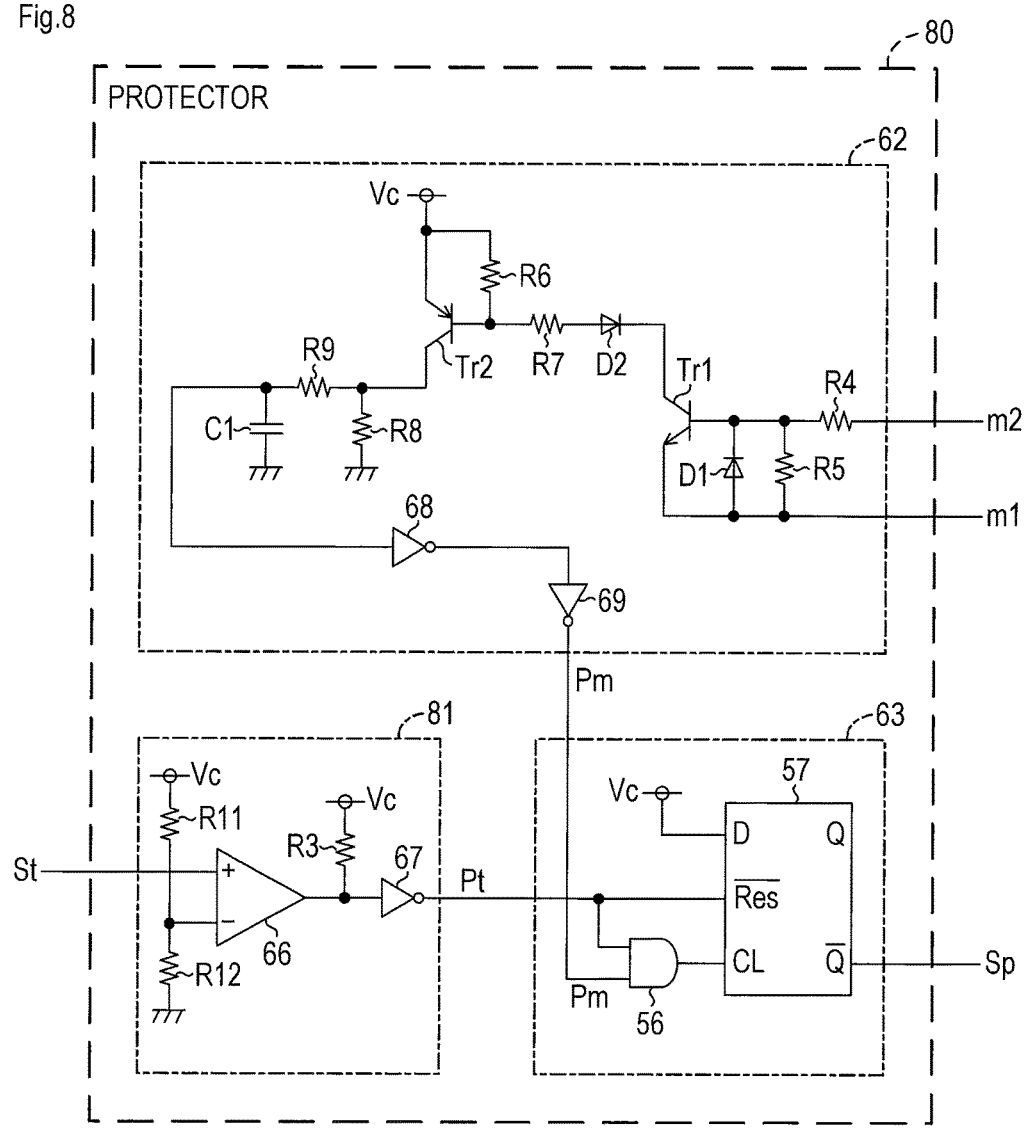
FIG. 8 is an electrical circuit diagram of a protection unit of a third embodiment.

As shown in FIG. 8, the protection unit 80 of the third embodiment is different from the protection unit 33 of the second embodiment mainly in two terms. One of the two differences is that input destinations of the motor signals m1 and m2 input to the motor state detector 62 are opposite. That is, in this third embodiment, the second motor signal m2 is input to one end of the resistor R4, and the first motor signal m1 is input to the emitter of the first transistor Tr1.

Therefore, the logical relationship between the rotation direction and the motor state detection signal Pm of the motor 10 is opposite to that of the second embodiment. In this third embodiment, as shown in FIG. 9B, when the motor 10 rotates in the CW direction and opening operation of the upper blade 3 is performed, the first transistor Tr1 and the second transistor Tr2 are turned on and the motor state detection signal Pm becomes H level. When the motor 10 rotates in the CCW direction and closing operation of the upper blade 3 is performed, the motor state detection signal Pm becomes L level.

The other one of the two differences from the second embodiment is a configuration of a trigger state detector 81. As shown in FIG. 8, in the trigger state detector 81 of the third embodiment, the trigger signal St is input to the non-inverting input terminal of the comparator 66, and the threshold value is input to the inverting input terminal. Further, the threshold value is 2.7 V in this third embodiment, which is different from the second embodiment.

The trigger state detector 81 of the third embodiment is configured to detect whether the value of the trigger signal St is a value determined in the controller 32 to rotate the motor 10 in the CCW direction or stop the motor, or a value determined to rotate the motor in the CW direction. On the other hand, the controller 32 is configured to rotate the motor 10 in the CW direction when the value of the trigger signal St is higher than 2.7 V. Therefore, the threshold value input to the inverting input terminal of the comparator 66 is set to be 2.7 V in the third embodiment. The threshold value of 2.7 V is generated by dividing the control voltage Vc by resistors R11 and R12.

Accordingly, as shown in FIG. 9B, when the value of the trigger signal St is 2.7 V or less, the trigger state detection signal Pt output from the trigger state detector 81 is H-level. On the other hand, when the value of the trigger signal St is higher than 2.7 V, the trigger state detection signal Pt output from the trigger state detector 81 is L level.

In such a configuration, it is assumed that abnormal software processing (so-called runaway), other anomalies, failures or the like occur to the controller 32, and the motor 10 rotates in the CW direction to start unintended opening operation of upper blade 3 although the trigger 6 is not returned (i.e., the trigger 7 is either pulled or stopped). This means that an abnormality has occurred in which, although the value of the trigger signal St is a value determined in the controller 32 to rotate the motor 10 in the CCW direction or stop the motor 10 (2.7 V or less), the motor 10 is actually rotating in the CW direction.

In this case, as shown in FIGS. 9A and 9B, the trigger state detection signal Pt is H level. Moreover, the fact that motor 10 has actually started to rotate in the CW direction means that the first motor signal m1 is L level and the second motor signal m2 is H level. Therefore, the motor state detection signal Pm is changed from L level to H level. Thus, the output signal of the AND circuit 56, i.e., the clock signal CL input to the clock input terminal of the D-FF 57, is changed from L level to H level, and the protection signal Sp is changed from H level to L level. Accordingly, the switches Q1 to Q5 are forced off, and power supply to the motor 10 is stopped to stop the motor 10.

When the motor 10 is stopped in this manner, the first motor signal m1 and the second motor signal m2 both become L level. Thus, the motor state detection signal Pm is changed again to L level. As a result, the clock signal is also changed to L level. However, as long as the trigger signal St is 2.7 V or less, the trigger state detection signal Pt still remains H level. Thus, the D-FF 57 is not reset, and the protection signal Sp remains latched at L level.

Then, if the specific condition is satisfied, the trigger state detection signal Pt becomes L level. The specific condition in the third embodiment is that the trigger 6 is returned, and thereby the value of the trigger signal St becomes higher than 2.7 V. When the specific condition is satisfied and the trigger state detection signal Pt becomes L level, the D-FF 57 is reset, and the L-level latch of the protection signal Sp is released. The protection signal Sp is changed to H level. When the protection signal Sp is changed to H level, the forced off state of the switches Q1 to Q5 is released.

According to the third embodiment described above, when opening operation of the upper blade 3 is performed against user intention due to abnormality, etc. in the controller 32, the opening operation can be suppressed. In the third embodiment, the specific rotation direction is the CCW direction.

Other Embodiments

Although the exemplary embodiments of the present disclosure have been described in the above, the present disclosure is not limited to the above embodiments, and may take a variety of forms.

(1) The protection unit for outputting the protection signal Sp may be configured to be other than the protection unit 33 shown in FIG. 4 and the protection unit 80 shown in FIG. 8. That is, the protection unit may take other configurations which enable detection of a situation, and output of a signal indicating that situation, that the value of the trigger signal St is a value determined in the controller 32 either to rotate the motor 10 in a specific rotation direction or to stop the motor 10, and the motor 10 is actually rotating in a direction opposite to the specific rotation direction.

(2) Further, it is not essential to configure the protection unit 33, 80 by a hardware circuit. For example, the protection unit 33, 80 may be configured such that the protection signal Sp or a signal similar thereto is output by software processing executed by a microcomputer.

(3) In the first embodiment, when an abnormal state is present, the path switch Q5 is turned off to stop the motor 10. Other various methods may be employed to particularly stop the motor 10 when an abnormal state is present.

For example, among the switches Q1 to Q4 of the H-bridge circuit 31, the first switch Q1 and the third switch Q3 as high side switches together may be forcibly turned off, or the second switch Q2 and the fourth switch Q4 as low-side switches together may be turned off.

Further, for example, a plurality of the path switches Q5 may be provided in series on the power supply path from the battery 30 to the motor 10, and the plurality of the path switches Q5 together may be forcibly turned off. Connecting positions of the path switches Q5 in the power supply path can be arbitrarily determined.

Further, for example, instead of the protective AND circuit 55, such a configuration may be adopted that the gate of the path switch Q5 and the ground line are forcibly conducted so as to turn off the path switch Q5. In the electric scissors 50 of the second embodiment, a similar configuration may be employed in which, in place of the AND circuits 71 to 74, the gate of each of the four switches Q1 to Q4 of the H-bridge circuit 31 and the ground line are conducted.

Also, for example, inside the battery unit 120, a switching element that can complete/interrupt a current path from the battery 30 to each of the terminals 120a and 120b may be provided at least in one of the current paths. The control unit 110 may be configured to be able to forcibly interrupt power supply from the battery 30 to the control unit 110 by turning off the switching element.

(4) The path switch Q5, the fifth buffer 45, and the protective AND circuit 55 may be removed from the configuration of the electric scissors 50 of the second embodiment. Even so, when an abnormal state is present, the switches Q1 to Q4 of the H-bridge circuit 31 are turned off, and the motor 10 can be stopped.

(5) In the first embodiment, the specific condition in which the L-level latch state of the protection signal Sp is released is pulling the trigger 6. However, other conditions may be adopted as the specific condition. For example, the specific condition may be a condition in which a switch provided for releasing the latched state is operated. The same applies to the second embodiment.

(6) In the above embodiments, the trigger signal St acquired by amplifying the detection signal of the Hall sensor 21 by the amplifier 22a has been illustrated as the operation signal indicating the operation state of the trigger 6. However, other signals indicating the operating state of the trigger 6 may be used. Moreover, it is not essential to use the sensor unit 20 having a Hall sensor and a magnet.

In the above embodiments, the sensor unit 20 is moved back and forth direction, following the rotation of the motor 10 (i.e., following the rotation of the upper blade 3). With such configuration, the upper blade 3 is stopped at a position corresponding to the pull amount of the trigger 6. However, stopping the upper blade 3 at a position corresponding to the pull amount of the trigger may be implemented using other configuration.

For example, using the mechanism as described in Patent Document 1, the upper blade 3 may be stopped at a position corresponding to the pull amount of the trigger 6. Further, for example, based on a signal indicating the pull amount of the trigger 6 and a signal indicating the position of the upper blade 3, position feedback control may be applied to the rotation of the upper blade 3 so that the position of the upper blade 3 matches the position corresponding to the pull amount of the trigger 6.

In this case, the control device controls the motor 10 based on the pull amount of the trigger 6 and the position of the upper blade 3. Therefore, in that case, a signal indicating the pull amount of the trigger 6 and a signal indicating the position of the upper blade 3 may be input also to the protection unit. The protection unit, based on the respective signals, may determine how the control device intends to control the motor 10. Then, based on a determination result and the actual operating state of the motor 10, the motor 10 may be forcibly stopped (the protection signal Sp may be changed to L level in the above-described embodiment) in the case where control contents by the control device and the actual operating state of the motor 10 are different.

In other words, the protection unit may receive information that enables determination on how the control device actuates the motor 10, and then may be allowed to determine control contents of the control device on the basis of the information. More specifically, for example, information the control device acquires in order to control the motor 10 (the trigger signal St in the above embodiment, and the signal indicating the pull amount of the trigger 6 and the signal indicating the position of the upper blade 3 in the case of feedback control based on the position of the upper blade 3) may be input to the protection unit, and the protection unit may make determination on the basis of the information.

(7) In the above embodiments, although the trigger 6 is illustrated as the operation device, the operation device to be operated by the user may be other components other than the trigger 6.

(8) The mechanism having the ball screw unit 12 and the coupling member 16 as the transmission mechanism for transmitting the rotational force of the motor 10 to the upper blade 3 is only an example. Transmission mechanisms having other configurations may be used that can transmit the rotational force of the motor 10 to the upper blade 3 to rotate the upper blade 3.

(9) In the above embodiments, the upper blade 3 is illustrated as the movable blade which is rotated by the rotational force of the motor 10. However, the shape, number, and installation position of the movable blade are not particularly limited. For example, the upper blade 3 and the lower blade 4 together may be configured to be rotated.

(10) The above embodiments are configured such that closing operation of the upper blade 3 is performed when the motor 10 rotates in the CCW direction, and opening operation of the upper blade 3 is performed when the motor 10 rotates in the CW direction. However, relationship between the rotation direction of the motor 10 and the operating direction of the upper blade 3 is not limited to the above relationship. Contrary to the above relationship, opening operation of the upper blade 3 may be performed when the motor 10 rotates in the CCW direction, and closing operation of the upper blade 3 may be performed when the motor 10 rotates in the CW direction.

(11) In the above embodiments, the H-bridge circuit 31 is illustrated as a drive circuit for supplying electric power to the motor 10. However, such a drive circuit is not limited to the H-bridge circuit 31. A drive circuit having other configuration may be used that enables power supply to motor 10 so that the motor 10 is actuated in accordance with control contents of the controller 32.

(12) In the above embodiments, the controller 32 is illustrated as being configured by a microcomputer. The controller 32 is not limited to a microcomputer, and may be configured, for example, by an ASIC or FPGA, other various ICs, logic circuits or the like.

(13) In the above embodiments, an example of the motor 10 is a DC motor. The motor 10 may be a motor other than DC motors (e.g., brushless motors, induction motors, stepper motors, etc.).

(14) In the above embodiments, functions of a single component may be dispersed as a plurality of components, or functions of a plurality of components may be integrated into a single component. Further, at least part of the configuration in the above embodiments may be replaced with a known configuration having a similar function. Also, part of the configuration of the above embodiments may be omitted. Further, at least part of the configuration of the above embodiments may be added or substituted to the configuration of the other of the above embodiments. All aspects included in the technical idea specified only by language as set forth in the appended claims are embodiments of the present disclosure.

What is claimed is:

1. Electric scissors comprising:
   a motor;
   a movable blade for cutting a cutting object, the blade configured to be rotatable in a closing direction and in an opening direction opposite to the closing direction, the closing direction being a direction in which the cutting object can be cut;
   a transmission configured to transmit a rotational force of the motor to the movable blade, the transmission configured to rotate the movable blade in the closing direction when the motor rotates in a first rotation direction, and rotate the movable blade in the opening direction when the motor rotates in a second rotation direction opposite to the first rotation direction;
   an actuator configured to be operated by a user for operation of the motor;
   an operation signal output device comprising a sensor configured to output an operation signal having a value corresponding to an operation state of the actuator;
   a controller configured to determine whether to rotate the motor in the first rotation direction or in the second rotation direction, or stop the motor, based on the value of the operation signal output from the operation signal output device, and output a control signal corresponding to a determination result;
   a drive circuit configured to supply electric power to the motor in accordance with the control signal output from the controller to actuate the motor in response to the control signal; and
   a force stopper comprising a circuit configured to stop the motor when an abnormal state is present in which the value of the operation signal output from the operation signal output device is a value determined in the controller to rotate the motor in a specific rotation direction out of the first and the second rotation directions or to stop the motor, and in which the motor is rotating in a direction opposite to the specific rotation direction.

2. The electric scissors according to claim 1, wherein the specific rotation direction is the second rotation direction.

3. The electric scissors according to claim 1, wherein the force stopper comprises:
   a stop signal output unit configured to output a stop signal for stopping the motor when the abnormal state is present; and
   a stop circuit configured to stop the motor by stopping power supply to the motor regardless of contents of the control signal while the stop signal is output from the stop signal output unit.

4. The electric scissors according to claim 3, wherein the stop signal output unit is configured by a hardware circuit.

5. The electric scissors according to claim 3, wherein the stop signal output unit comprises:
   a first signal output section configured to receive the operation signal output from the operation signal output device and output a first signal when the value of the operation signal is a value determined in the controller to rotate the motor in the specific rotation direction or to stop the motor;
   a second signal output section configured to acquire actual operation information indicating an actual operating state of the motor and output a second signal when the acquired actual operation information indicates that the motor is rotating in a direction opposite to the specific rotation direction; and
   a third signal output section configured to output the stop signal when the first signal is output from the first signal output section and the second signal is output from the second signal output section.

6. The electric scissors according to claim 3, wherein the stop signal output unit is configured to continue outputting the stop signal due to presence of the abnormal state until a specific condition is satisfied, and stop the output when the specific condition is satisfied.

7. The electric scissors according to claim 6, wherein the specific condition is a condition in which the actuator is operated in such a manner that the operation signal having a value determined in the controller to rotate the motor in the direction opposite to the specific direction is output from the operation signal output device.

8. The electric scissors according to claim 3, wherein the stop circuit comprises:
   a switch section provided separately from the drive circuit in a power supply path to the motor from a power source that supplies electric power to the motor and configured to complete/interrupt the power supply path; and
   a switch driving section configured to cause the switch section to interrupt the power supply path while the stop signal is output from the stop signal output unit.

9. The electric scissors according to claim 3, wherein the stop circuit is configured to disable the control signal input to the drive circuit from the controller to stop power supply to the motor from the drive circuit while the stop signal is output from the stop signal output unit.

10. The electric scissors according to claim 1, wherein the motor is a direct current (DC) motor configured such that the motor rotates as a DC voltage is applied to between a pair of terminals and that its rotation direction is switched by a polarity of the applied DC voltage, and
    the force stopper is configured to be able to determine, based on the DC voltage applied to the pair of terminals of the motor, whether the motor is rotating in the direction opposite to the specific rotation direction.

11. The electric scissors according to claim 10, wherein the drive circuit comprises an H-bridge circuit having four switching elements, and is configured to apply a DC voltage from the H-bridge circuit to between the pair of terminals of the motor.

* * * * *